US012736386B2

(12) United States Patent
He et al.

(10) Patent No.: US 12,736,386 B2
(45) Date of Patent: Sep. 15, 2026

(54) MEASUREMENT ASSEMBLY OF GUIDED WAVE RADAR LEVEL GAUGE WITH HIGH-TEMPERATURE AND HIGH-PRESSURE SEALED-COMPENSATION TYPE

(71) Applicant: Fujian Fuqing Nuclear Power Co., Ltd., Fuzhou (CN)

(72) Inventors: Zhiguo He, Fuzhou (CN); Yanmei Xiao, Fuzhou (CN); Qinyu Wang, Fuzhou (CN); Qinjie Ding, Fuzhou (CN); Heng Wang, Fuzhou (CN); Huangxi Zhang, Fuzhou (CN); Yan Lin, Fuzhou (CN); Deyin Li, Fuzhou (CN)

(73) Assignee: FUJIAN FUQING NUCLEAR POWER CO., LTD., Fuzhou (CN)

( * ) Notice: Subject to any disclaimer, the term of this patent is extended or adjusted under 35 U.S.C. 154(b) by 238 days.

(21) Appl. No.: 18/407,335

(22) Filed: Jan. 8, 2024

(65) Prior Publication Data

US 2024/0418557 A1 Dec. 19, 2024

(30) Foreign Application Priority Data

Jun. 14, 2023 (CN) ......................... 202310701981.1

(51) Int. Cl.
*G01F 23/284* (2006.01)

(52) U.S. Cl.
CPC .................................. *G01F 23/284* (2013.01)

(58) Field of Classification Search
CPC ..................................................... G01F 23/284
See application file for complete search history.

(56) References Cited

U.S. PATENT DOCUMENTS

| | | | |
|---|---|---|---|
| 9,927,281 | B1 | 3/2018 | Anand et al. |
| 2006/0000274 | A1 | 1/2006 | Kallsand et al. |

(Continued)

FOREIGN PATENT DOCUMENTS

| | | | |
|---|---|---|---|
| CN | 106796138 | A | 5/2017 |
| CN | 207147588 | U | 3/2018 |

(Continued)

OTHER PUBLICATIONS

First Office Action issued on Jul. 21, 2023 for counterpart Chinese Patent Application No. 202310701981.1.

(Continued)

*Primary Examiner* — Nazra Nur Waheed
(74) *Attorney, Agent, or Firm* — LOZA & LOZA, LLP; Michael F. Fedrick

(57) ABSTRACT

The present disclosure relates to the field of electronic measurements, and particularly to a measurement assembly of guided wave radar level gauge with high-temperature and high-pressure sealed-compensation type, includes an gauge isolation enclosure, and an upper sealing structure is mounted at a lower part of the gauge isolation enclosure, a heat dissipation section is mounted between the upper sealing structure and a middle sealing structure, and a lower sealing structure is mounted at a lower part of the middle sealing structure; a housing is disposed to sleeve the middle sealing structure, a flange is connected outside the housing, a guide cylinder is connected to a lower part of the housing, and a compensation structure and a support member are disposed in the guide cylinder. The present disclosure has the advantageous effect of adopting a multi-layer sealing design and a tightness verification design.

7 Claims, 4 Drawing Sheets

(56) References Cited

U.S. PATENT DOCUMENTS

| | | | | |
|---|---|---|---|---|
| 2008/0134778 | A1* | 6/2008 | Osswald | G01F 23/284 73/304 C |
| 2012/0323503 | A1* | 12/2012 | Welle | G01F 23/263 73/304 C |
| 2013/0314275 | A1* | 11/2013 | Fredriksson | G01S 13/08 342/124 |
| 2016/0153820 | A1* | 6/2016 | Heath | H01Q 13/08 342/124 |
| 2018/0113020 | A1* | 4/2018 | Fredriksson | G01F 23/284 |

FOREIGN PATENT DOCUMENTS

| | | | | |
|---|---|---|---|---|
| CN | 109655134 | A | 4/2019 | |
| CN | 209372172 | U | 9/2019 | |
| CN | 110553697 | A * | 12/2019 | G01F 23/284 |
| CN | 112254787 | A | 1/2021 | |
| CN | 214747428 | U | 11/2021 | |
| CN | 215413943 | U | 1/2022 | |
| CN | 216012393 | U | 3/2022 | |
| CN | 216283805 | U | 4/2022 | |
| CN | 216448994 | U | 5/2022 | |
| CN | 217155529 | U | 8/2022 | |
| CN | 217818923 | U | 11/2022 | |
| CN | 115979379 | A | 4/2023 | |
| DE | 10154072 | A1 | 5/2003 | |
| JP | S61277020 | A | 12/1986 | |
| JP | 2008128717 | A | 6/2008 | |

OTHER PUBLICATIONS

Search report issued on Jul. 21, 2023 for counterpart Chinese Patent Application No. 202310701981.1.

Supplemental search report issued on Jul. 27, 2023 for counterpart Chinese Patent Application No. 202310701981.1.

* cited by examiner

MEASUREMENT ASSEMBLY OF GUIDED WAVE RADAR LEVEL GAUGE WITH HIGH-TEMPERATURE AND HIGH-PRESSURE SEALED-COMPENSATION TYPE

CROSS REFERENCE TO RELATED APPLICATION

This application claims priority to Chinese Patent Application No. 202310701981.1, filed on Jun. 14, 2023, which is hereby incorporated by reference in its entirety.

TECHNICAL FIELD

The present disclosure relates to the field of electronic measurements, and particularly to a measurement assembly of guided wave radar level gauge with high-temperature and high-pressure sealed-compensation type.

BACKGROUND

The guided wave radar level gauge is a new type of level gauge, which is based on the time domain reflection (TDR) principle and is the product of the combination of a non-contact radar and a guided wave antenna. The guided wave radar level gauge sends an electromagnetic wave signal to a guided wave used as a signal transmission medium. When encountering substances with different densities (or different dielectric constants), the signal of radar level gauge is partially reflected to form an echo which returns to a signal sending device (receiving antenna) along the same path, so as to calculate a level height based on a time difference between the sent signal and the echo signal. The guided wave radar level gauge is not affected by the factors such as measurement environment, measurement medium, etc., and is widely used in the field of industrial measurements.

The secondary circuit of a nuclear power plant needs to experience working conditions of negative pressure, high-temperature and high-pressure saturated steam, power change, and the traditional level gauges (e.g., differential pressure level gauge, float level gauge, etc.) cannot achieve the accurate measurement of the overall working conditions. The key devices of the secondary circuit (e.g., high-pressure heater, moisture separator reheater, etc.) are in the frequently-changed working condition of high-temperature and high-pressure saturated steam, and the temperature, the pressure and the medium density change accordingly. Since the traditional level gauges (e.g., differential pressure level gauge, float level gauge, etc.) have a large thermal measurement deviation due to their own measurement principle, it is necessary to input the current pressure and temperature for a thermal compensation and perform a calibration regularly, which greatly increases the maintenance workload. In addition, the differential pressure level gauge cannot work under the negative pressure for the level measurement.

The high-temperature and high-pressure sealed-compensation type guided wave radar level gauge is a new high-end industrial automatic level gauge based on the guided wave radar principle and the sealed steam compensation technology. In the high-temperature and high-pressure saturated steam environment of the secondary circuit, the dielectric constants of steam and water will both change, especially a steam polarization effect occurs. The change of the dielectric constant of the propagation medium will directly affect the electromagnetic wave velocity, and if the reference steam compensation technology is not adopted, a large measurement deviation will be directly caused. The steam compensation is substantively a compensation for the electromagnetic wave velocity. For example, in an environment of 300° C. and 10 MPa, a relative dielectric constant of water will decrease from 78.5 to 18, and a relative dielectric constant of steam will increase from 1.0 to 1.5. The increase of the dielectric constant of steam will slow down the propagation speed of the electromagnetic wave in the guided wave rod, and if no compensation measures are taken for the dielectric constant of the gaseous phase, a measurement error up to 20% may be caused.

Due to the gauge design, the existing measurement assemblies have the failures of leakage and unstable steam compensation in practical applications. The failure of leakage refers to the failure of high-temperature sealing of the measurement assembly, which leads to the leakage of the medium in the measurement environment from the sealing structure of the measurement assembly due to thermal aging, thermal corrosion, penetration, micro-vibration and other mechanisms, resulting in the failure of the gauge. The failure of unstable steam compensation refers to the unreasonable design of the steam compensation structure of the measurement assembly, which is easily disturbed by the external environment and leads to the distortion of the measured value.

SUMMARY

An objective of the present disclosure is to provide a measurement assembly of guided wave radar level gauge with high-temperature and high-pressure sealed-compensation type, which can solve the failures of leakage, unstable steam compensation, etc. of the existing measurement assembly of guided wave radar level gauge with high-temperature and high-pressure sealed-compensation type in practical applications.

The technical solution of present disclosure is as follows: a measurement assembly of guided wave radar level gauge with high-temperature and high-pressure sealed-compensation type, including an gauge isolation enclosure, and an upper sealing structure is mounted at a lower part of the gauge isolation enclosure, a heat dissipation section is mounted between the upper sealing structure and a middle sealing structure, and a lower sealing structure is mounted at a lower part of the middle sealing structure; a housing is disposed to sleeve the middle sealing structure, a flange is connected outside the housing, a guide cylinder is connected to a lower part of the housing, and a compensation structure and a support member are disposed in the guide cylinder.

The upper sealing structure includes a compression nut and a sealing ring, the compression nut is disposed in the gauge isolation enclosure, the middle of the compression nut is provided with a via-hole, an upper part of the guided wave core rod passes through the via-hole of the compression nut, a lower part of the compression nut is connected to a heat dissipation section, the heat dissipation section is connected to the gauge isolation enclosure, and the middle of the heat dissipation section is provided with a via-hole in which the middle sealing structure is mounted.

The middle sealing structure includes a first heat-insulation sealing member, and the middle of the first heat-insulation sealing member is sleeved by the guided wave core rod, and the sealing ring includes an inner sealing ring mounted inside the top of the first heat-insulation sealing member and an outer sealing ring mounted outside the top of the first heat-insulation sealing member.

The lower sealing structure includes a first graphite gasket, a second graphite gasket and a second heat-insulation sealing member.

A lower part of the heat dissipation section is sleeved in the housing, and a bottom of the heat dissipation section is in contact with the second heat-insulation sealing member; the second heat-insulation sealing member is provided with a via-hole in the middle thereof and the second heat-insulation sealing member includes an inner sealing structure and an outer sealing structure; and in the outer sealing structure, the second graphite gasket is mounted between the second heat-insulation sealing member, the heat dissipation section and the housing, and the first graphite gasket is mounted between the second heat-insulation sealing member and the first heat-insulation sealing member.

The second heat-insulation sealing member has a condensate water diversion structure which adopts an inverted cone structure.

A flange is disposed to sleeve the housing, and the guide cylinder is located below the flange and connected to the housing.

Interconnection holes are distributed on a cylinder wall of the guide cylinder at an equal interval along a same vertical direction, the support members are disposed inside the guide cylinder at an equal interval from top to bottom, and a tail-end support member is disposed at an end of the guide cylinder.

The compensation structure is disposed in the middle of the guided wave core rod and has a diameter larger than that of the guided wave core rod, the upper part of the guided wave core rod is inserted into a sealing member, a first heat-insulation sealing member and the compression nut, a middle section of the guided wave core rod is connected to the compensation structure, and a lower part of the guided wave core rod is inserted into a measuring medium.

The heat dissipation section is provided with a test hole for sealing test.

The present disclosure has the advantageous effect of adopting a multi-layer sealing design and a leakage test design. The measurement assembly adopts a new steam compensation structure, which may significantly reduce the interferences of condensate water and steam polarization effect in the measurement working condition, and reduce the amplification influence of the interferences by optimizing the size of the steam compensation structure. In the high-temperature and high-pressure vapor-liquid two-phase environment, this high-temperature and high-pressure resistant sealed heat-insulation structure can prevent the gauge from being unusable due to the leakage from the measurement assembly, and prevent the gauge processor from thermal aging due to the poor heat insulation and dissipation of the gauge. The measurement assembly is applicable to measure the level of a high-pressure heater, a low-pressure heater, a condenser and a drained of a steam-water separation reheater in a secondary circuit of a nuclear power plant, and may provide accurate level measurement data for generator units in case of various working conditions (high and low temperature environments with a negative pressure, a normal pressure or a high pressure) of the circuit and changes thereof.

DETAILED DESCRIPTION

Figure 1:
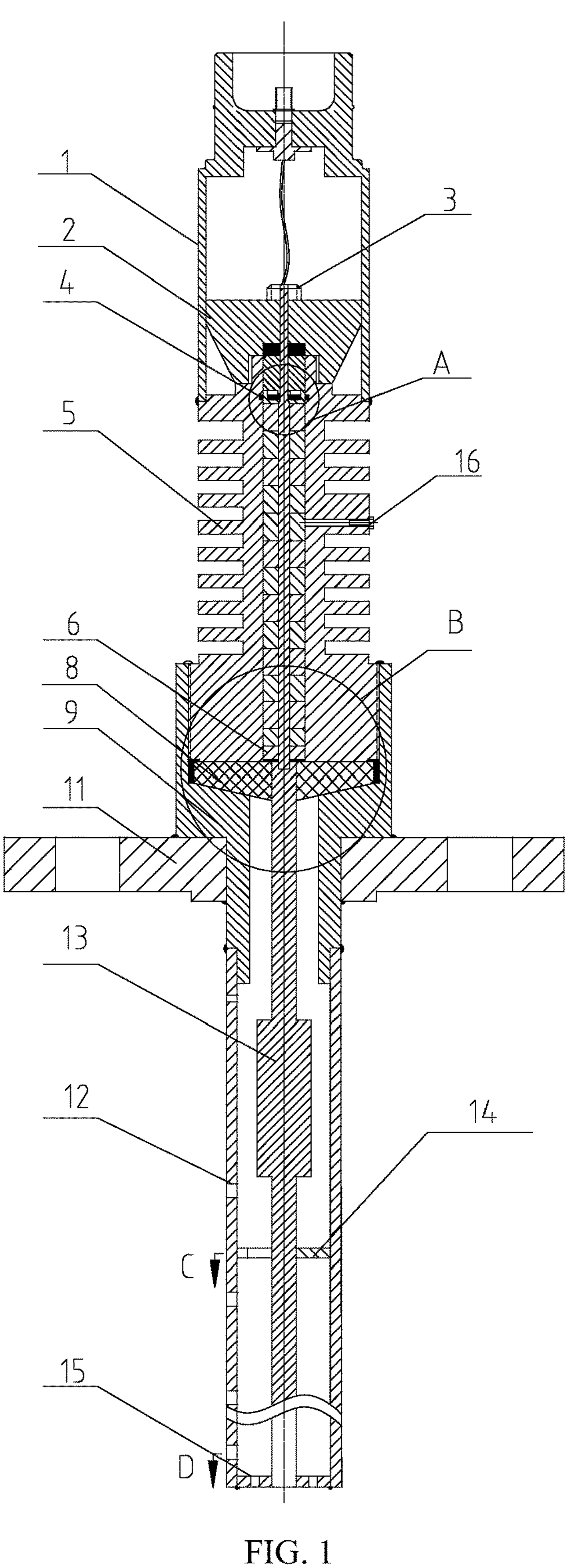
FIG. 1 is a schematic structural diagram of a measurement assembly of guided wave radar level gauge with high-temperature and high-pressure sealed-compensation type according to the present disclosure.

The present disclosure will be further described in detail with reference to the drawings and the specific embodiments.

As illustrated in FIGS. 1 to 5, a measurement assembly of guided wave radar level gauge with high-temperature and high-pressure sealed-compensation type includes a gauge isolation enclosure 1, a compression nut 2, a nut 3, a sealing ring 4, a heat dissipation section 5, a first heat-insulation sealing member 6, a graphite gasket, a second heat-insulation sealing member 8, a housing 9, a guided wave core rod 10, a flange 11, a guide cylinder 12, a compensation structure 13, a support member 14, a tail-end support member 15 and a test hole for sealing test 16.

In this embodiment, the gauge isolation enclosure 1 is disposed at the top of a device to provide a mounting position for a gauge processor and reduce the heat radiation of the gauge processor, and the measurement assembly includes an upper sealing structure, a middle sealing structure and a lower sealing structure.

The upper sealing structure is mounted at a lower part of the gauge isolation enclosure 1, the heat dissipation section 5 is mounted between the upper sealing structure and the middle sealing structure, the lower sealing structure is mounted at a lower part of the middle sealing structure, the housing 9 is disposed to sleeve the middle sealing structure, the flange 11 is connected outside the housing 9, the guide cylinder 12 is connected to a lower part of the housing 9, and the compensation structure 13, the support member 14 and the tail-end support member 15 are mounted in the guide cylinder 12.

Figure 2:
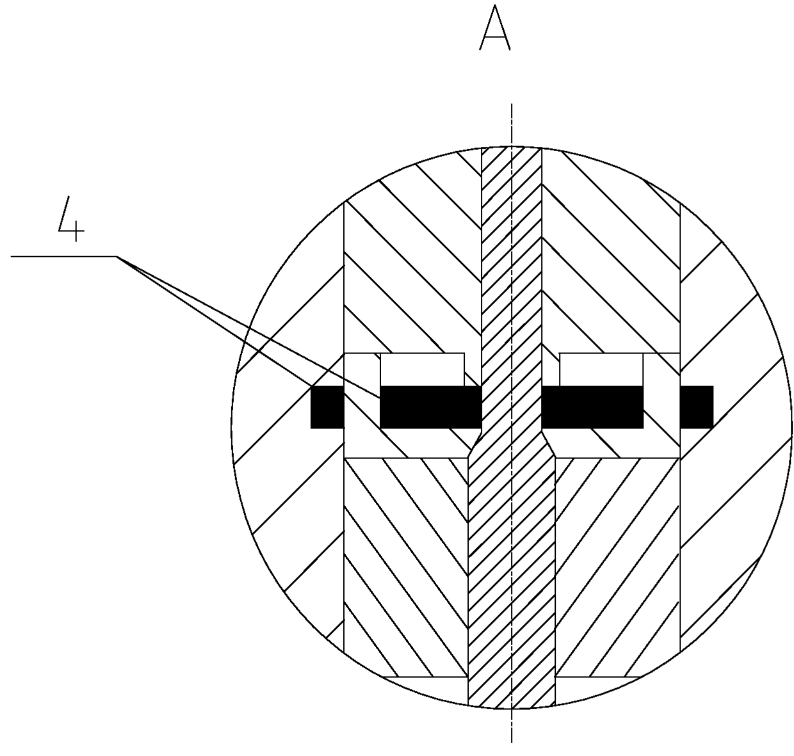
FIG. 2 is a schematic structural diagram of an enlarged view of Part A in FIG. 1.
Figure 3:
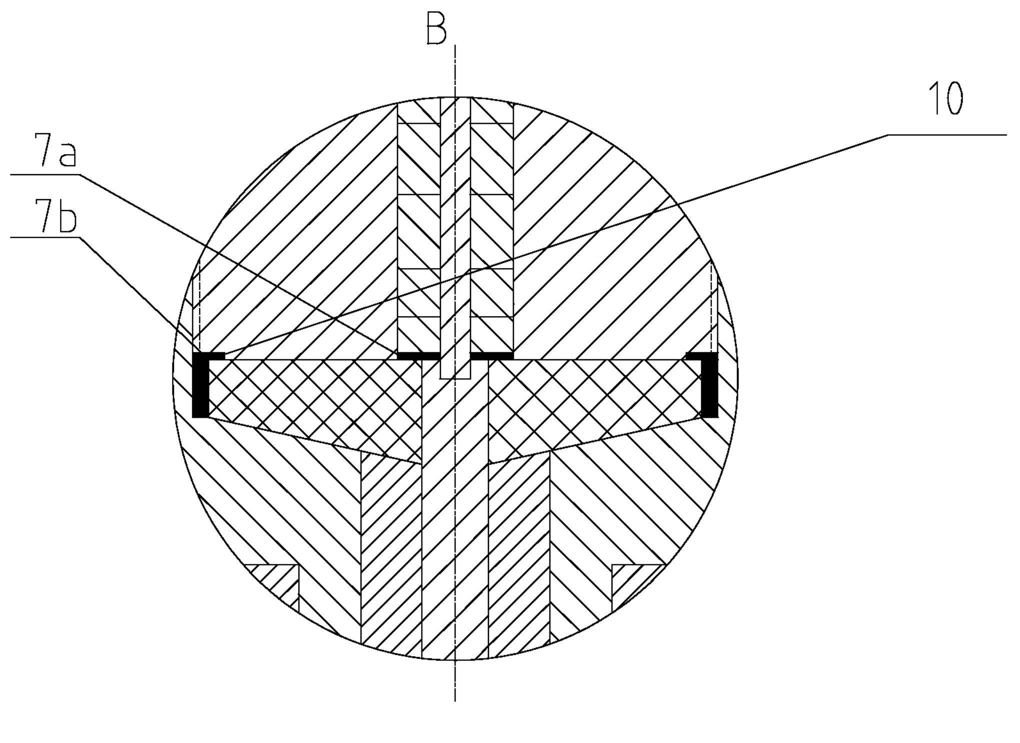
FIG. 3 is a schematic structural diagram of an enlarged view of Part B in FIG. 1.

The upper sealing structure includes the compression nut 2, the nut 3 and the sealing ring 4, and the compression nut 2 is disposed in the gauge isolation cover 1, the center of the compression nut 2 is provided with a via-hole, an upper part of the guided wave core rod 10 passes through the via-hole of the compression nut 2 and is connected together with the nut 3 disposed at the top of the compression nut 2, and an O-shaped sealing ring is disposed between the nut 3 and the compression nut 2. The compression nut 2 has the function of compressing and sealing the measurement assembly (the guided wave core rod 10), a lower part of the compression nut 2 is connected to the heat dissipation section 5 by threads, the heat dissipation section 5 is connected to the gauge isolation enclosure 1 and externally provided with annular fins, and the center of the heat dissipation section 5 is provided with a via-hole in which the middle sealing structure is mounted. The middle sealing structure includes a first heat-insulation sealing member 6 including a group of standard annular heat-insulation sealing members, and the material of the annular heat-insulation sealing members has good high-pressure resistance and small thermal expansion coefficient, and the heat-insulation sealing members are made of ceramics of alumina, zirconia and magnesia or polymer materials with good high-temperature resistance, and good sealing performance, so can bear the high temperature of more than 500° C. for a long time. The guided wave core rod 10 is located inside the first heat-insulation sealing member 6 and is sleeved inside the inner; as illustrated in FIG. 2, the sealing ring 4 is divided into an inner O-shaped sealing ring and an outer O-shaped sealing ring, and the inner O-shaped sealing ring is mounted inside the top of the first heat-insulation sealing member 6 to seal a water leakage between the heat-insulation sealing ceramic and the guided wave core rod 10; and the outer O-shaped sealing ring is mounted outside the top of the first heat-insulation sealing member 6 to seal a water leakage between the first heat-insulation sealing member 6 and the heat dissipation section 5. The sealing ring 4 adopts the material of the poly (PEEK) to seal.

The lower sealing structure includes a first graphite gasket 7*a*, a second graphite gasket 7*b* and a second heat-insulation sealing member 8. A lower part of the heat dissipation section 5 is sleeved in the housing 9, and a bottom of the heat dissipation section 5 is in contact with the second heat-insulation sealing member 8; the second heat-insulation sealing member 8 is provided with a via-hole in the center thereof and includes an inner sealing structure and an outer sealing structure, and in the outer sealing structure, the second graphite gasket 7*b* is mounted between the second heat-insulation sealing member 8, the heat dissipation section 5 and the housing 9 using an L-shaped graphite annular filler, a joint between the housing 9 and the heat dissipation section 5 is provided with a welding seal, and the welding is surfacing welding. The first graphite gasket 7*a* is mounted between the second heat-insulation sealing member 8 and the first heat-insulation sealing member 6; the guided wave core rod 10 passes through the via-hole in the center of the second heat-insulation sealing member 8 and is integrally cast to reduce the assembly gap and seal the guided wave core rod 10. The second heat-insulation sealing member 8 includes a condensate water diversion structure, and the formed condensate water cannot accumulate and then flows downward along the guided wave core rod 10 due to an inverted cone design adopted, thereby avoiding the performance gauge value from seriously drifting due to the interference of the condensate water on the level measurement.

The housing 9 is sleeved by a flange by welding, the guide cylinder 12 is located below the flange 11, and the guide cylinder 12 is connected to the housing 9 by socket welding.

Figure 4:
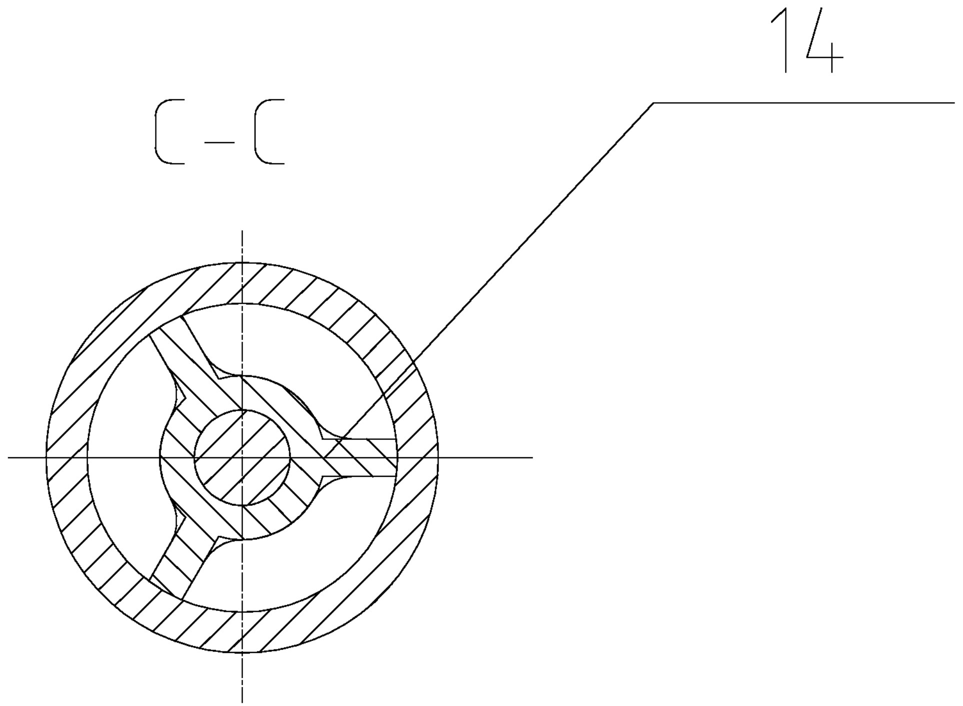
FIG. 4 is a schematic structural diagram of a view taken along line C-C in FIG. 1.
Figure 5:
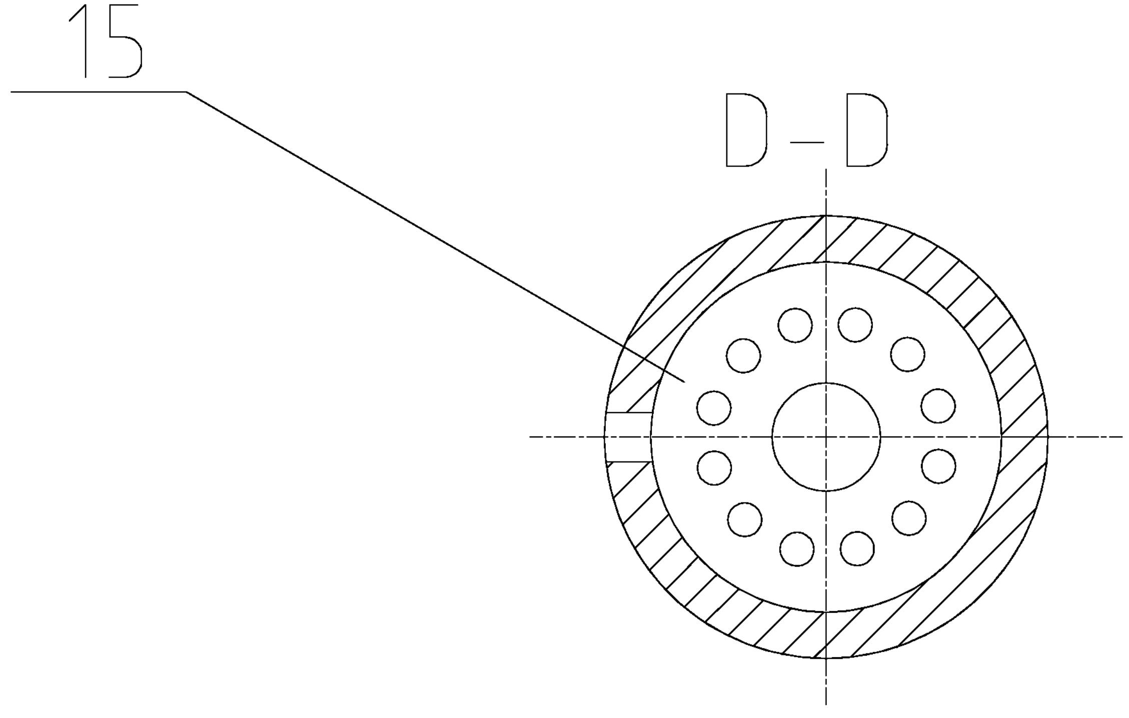
FIG. 5 is a schematic structural diagram of a view taken along line D-D in FIG. 1.

Interconnection holes are distributed on a cylinder wall of the guide cylinder 12 at an equal interval (40 cm) along a same vertical direction, and are mainly used for gas exhaust and the level interconnection of the measuring medium. The support members 14 are distributed inside the guide cylinder 12 at an equal interval (60 cm) from top to bottom. The support member 14 is made of a high-temperature resistant ceramic material, such as the ceramics of alumina, zirconia, magnesia or polymer material. As illustrated in FIG. 4, the shape of the support member 14 is streamlined. As illustrated in FIG. 5, the tail-end support member 15 is disposed at the end of the guide cylinder and made of stainless steel to prevent the support member 14 from falling into the measuring medium after being broken.

The compensation structure 13 is disposed on the guided wave core rod 10, with a diameter 1 cm larger than that of the guided wave core rod 10. The compensation structure 13 is disposed in a stable steam flow field and increases a steam compensation section. When a high-frequency electromagnetic wave arrives at a start point of the steam compensation structure, time t1 is recorded, and when the high-frequency electromagnetic wave arrives at an end point of the steam compensation structure, time t2 is recorded. A length H of the steam compensation structure is fixed, and a wave velocity of the steam environment can be obtained based on $H/(t2-t1)$, thereby compensating for the actual liquid level. The guided wave core rod 10 has an upper part inserted into the second heat-insulation sealing member 8, the first heat-insulation sealing member 6 and the compression nut 2; a middle part connected to the compensation structure 13; and a lower part inserted into the measuring medium.

The heat dissipation section 5 is provided with a test hole for sealing test 16, and the test hole for sealing test 16 is subjected to a pressure test with nitrogen of 16 MPa after the measurement assembly is assembled. If the pressure is stable, it means that the sealing performance is good and surfacing welding may be adopted for sealing.

The present disclosure has the following advantages:

There are three layers (the upper part, the middle part and the lower part) and various sealing structure designs in the measurement assembly. The lower part adopts the inverted cone sealing structure, the graphite gasket sealing and the surfacing sealing; the first heat-insulation sealing member of the middle sealing structure has good sealing and decompression effects; and the upper sealing structure (the O-shaped sealing ring and the compression nut 2) may achieve the final sealing. A nitrogen sealing test channel is disposed to verify long-term sealing performance of the detector, and it is fixed by welding after the result of the sealing test is successful.

The start point and the end point of the compensation structure are both set in a stable and difficult-to-condense area, i.e., the compensation structure is provided at a position 400~500 mm below the top of the guide cylinder, where the steam flow field is stable and is not affected by the steam interconnection pipe. The compensation structure is appropriately extended, and the steam compensation section is also adaptively extended based on the measuring range to reach a length of at least 400~1300 mm, which reduces the magnification times of the compensation error.

A unique condensate water diversion is provided. The second heat-insulation sealing member 8 adopts an inverted cone structure, so that the condensate water cannot accumulate and then flows downward in time along the guided wave core rod 10, thereby achieving the function of timely diverting the condensate water to avoid the influence of the condensate water on the gauge measurement.

What is claimed is:

1. A measurement assembly of guided wave radar level gauge with high-temperature and high-pressure sealed-compensation type, comprising a gauge isolation enclosure, wherein:

an upper sealing structure is mounted at a lower part of the gauge isolation enclosure, a heat dissipation section is mounted between the upper sealing structure and a middle sealing structure, and a lower sealing structure is mounted at a lower part of the middle sealing structure; and a housing is disposed to sleeve the middle sealing structure, a flange is connected outside the housing, a guide cylinder is connected to a lower part of the housing, and a compensation structure and a support member are disposed in the guide cylinder, wherein the upper sealing structure comprises a compression nut and a sealing ring, the compression nut is disposed in the gauge isolation enclosure, the center of the compression nut is provided with a via-hole, an upper part of a guided wave core rod passes through the via-hole of the compression nut, a lower part of the compression nut is connected to a heat dissipation section, the heat dissipation section is connected to the gauge isolation enclosure, and the center of the heat dissipation section is provided with a via-hole in which the middle sealing structure is mounted;

wherein the middle sealing structure comprises a first heat-insulation sealing member, the middle of the first heat-insulation sealing member is sleeved by the guided wave core rod, the sealing ring comprises an inner sealing ring mounted inside the top of the first heat-insulation sealing member, and an outer sealing ring is mounted outside the top of the first heat-insulation sealing member;

wherein the lower sealing structure comprises a first graphite gasket, a second graphite gasket and a second heat-insulation sealing member; and wherein a lower part of the heat dissipation section is sleeved in the housing, and a bottom of the heat dissipation section is in contact with the second heat-insulation sealing member; the second heat-insulation sealing member is provided with a via-hole in the center thereof and the second heat-insulation sealing member has an inner sealing structure and an outer sealing structure; and in the outer sealing structure, the second graphite gasket is mounted between the second heat-insulation sealing member, the heat dissipation section and the housing, and the first graphite gasket is mounted between the second heat-insulation sealing member and the first heat-insulation sealing member, wherein a first portion of the second graphite gasket is disposed between an outer peripheral surface of the second heat-insulation sealing member and the housing, a second portion of the second graphite gasket is disposed between the second heat-insulation sealing member and the heat dissipation section, the first portion of the second graphite gasket and the second portion of the second graphite gasket are arranged in an L-shaped annular manner, a part of an end face of the heat dissipation section is in contact with the second heat-insulation sealing member, and a remaining part of the end face is spaced apart from the second heat-insulation sealing member by the second portion of the second graphite gasket.

2. The measurement assembly of guided wave radar level gauge with high-temperature and high-pressure sealed-compensation type according to claim 1, wherein the second heat-insulation sealing member has a condensate water diversion structure which adopts an inverted cone structure.

3. The measurement assembly of guided wave radar level gauge with high-temperature and high-pressure sealed-compensation type according to claim 1, wherein a flange is disposed to sleeve the housing, and the guide cylinder is located below the flange and connected to the housing.

4. The measurement assembly of guided wave radar level gauge with high-temperature and high-pressure sealed-compensation type according to claim 1, wherein interconnection holes are distributed on a cylinder wall of the guide cylinder at an equal interval along a same vertical direction, support members are disposed inside the guide cylinder at an equal interval from top to bottom, and a tail-end support member is disposed at an end of the guide cylinder.

5. The measurement assembly of guided wave radar level gauge with high-temperature and high-pressure sealed-compensation type according to claim 1, wherein the compensation structure is disposed in a middle of the guided wave core rod and has a diameter larger than that of the guided wave core rod, the upper part of the guided wave core rod is inserted into a sealing member, a first heat-insulation sealing member and the compression nut, a middle section of the guided wave core rod is connected to the compensation structure, and a lower part of the guided wave core rod is inserted into a measuring medium.

6. The measurement assembly of guided wave radar level gauge with high-temperature and high-pressure sealed-compensation type according to claim 5, wherein a diameter of a middle portion of the compensation structure is larger than a diameter of two end portions of the compensation structure, and stepped structures are respectively formed between the middle portion and the two end portions.

7. The measurement assembly of guided wave radar level gauge with high-temperature and high-pressure sealed-compensation type according to claim 1, wherein the heat dissipation section is provided with a test hole for a sealing test.

* * * * *